Jan. 1, 1946.  J. J. DE LA ROZA, SR  2,392,123
PISTON SEAL
Filed Jan. 3, 1944

INVENTOR.
JOAQUIN J. DE LA ROZA, SR.
BY
ATTORNEY.

UNITED STATES PATENT OFFICE 2,392,123

PISTON SEAL

Joaquin J. de la Roza, Sr., New York, N. Y.

Application January 3, 1944, Serial No. 516,817

3 Claims. (Cl. 309—4)

This invention relates to improvements in piston seals and refers more particularly to an adjustable gland assembly attached to the pressure end of the piston which is self-tightening.

Where high pressures are employed in compressors, pumps or pumping devices of any kind difficulties are experienced with the conventional self-adjusting type of packed piston. These difficulties are usually due to improper adjustment of the gland. If the gland is adjusted too tight the packing is rapidly worn and if adjusted too loose an unsatisfactory seal results. Furthermore, if the packing is hardened by heat, chemical action or for other cause, periodic adjustment produces a solid unyieldable packing which if not frequently serviced and inspected produces scoring of the piston or cylinder walls and leakage of the seal.

The present invention has for its primary object the elimination of these difficulties by employment of a self-adjusting gland of a novel and positive type.

Innumerable different types of self-adjusting pistons have been devised but such devices have not proved satisfactory for commercial use because of the difficulty of maintaining the close tolerances required when the piston is subjected to the wide range of pressure encountered in commercial practice and particularly in the larger diameter pistons. Self-adjusted pistons normally operate on a principle of differential pressure imposed upon the top of the piston and transmitted by a gland to the packing which produces the seal.

In the design of the instant piston differences between the area of the top of the piston and the area of the surface acting upon the packing are proportioned to produce a radial pressure at the packing sufficient to maintain a proper seal at all times.

The gland assembly utilizing the invention permits more latitude in the fitting of the piston and cylinder without sacrificing the effectiveness of the seal. Another feature of novelty in the instant gland assembly is the attaching means, or bolt by which the gland is fastened to the piston. This bolt establishes the necessary initial pressure on the packing to form the seal. Being located in a sealed well in the top of the gland, fluid pressure is prevented from entering the space between the piston and gland or leakage developing behind the gland and packing. Thus there is maintained on opposite sides of the piston and beneath the gland the existing differential pressures. The structure has been devised to overcome defects present in self-adjusting pistons and is adapted to operate regardless of pressures within the cylinder on either side of the piston.

Figure 1:
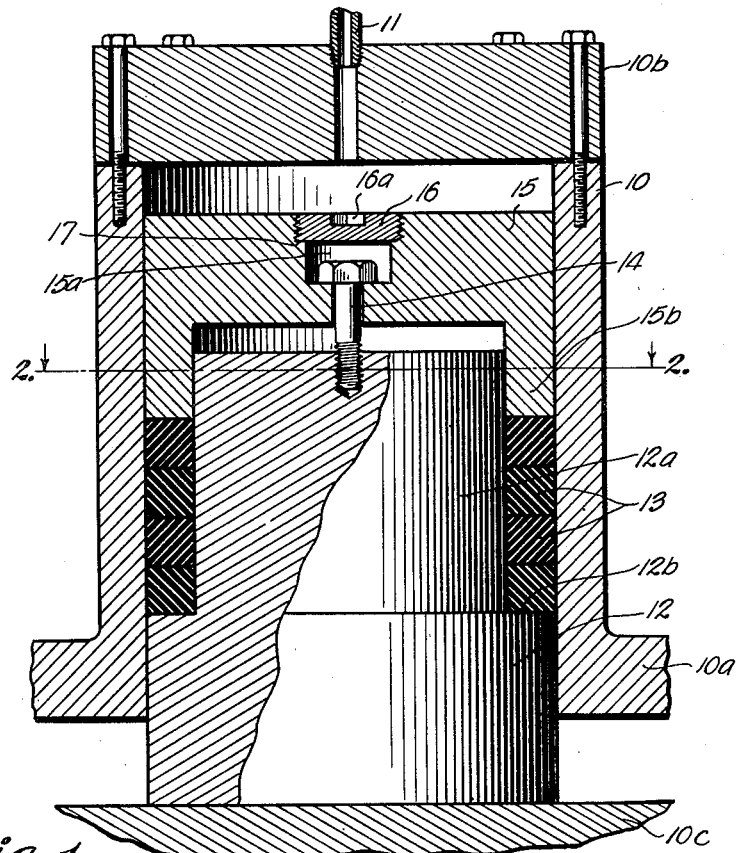
Figure 2:
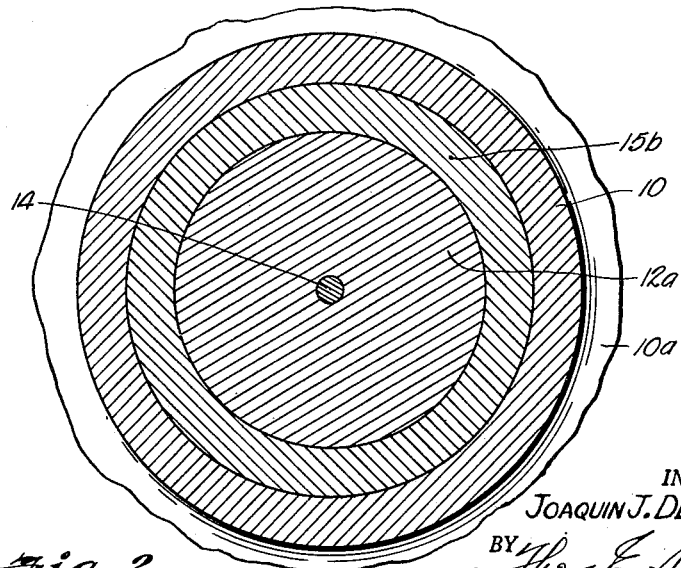

In the accompanying drawing which forms a part of the instant specification and are to be read in conjunction therewith and in which like reference numerals are used to indicate like parts in the various views, Fig. 1 is a center sectional view with a portion of the piston in elevation, Fig. 2 is a view taken along the line 2—2 in Fig. 1, in the direction of the arrows.

Referring to the drawing, at 10 is shown a cylinder forming part of a housing 10a. The cylinder has a removable pressure-tight head 10b held in place by bolts which seat the head upon a gasket positioned between the head and top of the cylinder. In the cylinder head 10b is a fluid inlet and discharge pipe 11 suitably controlled by valve mechanism not shown by means of which a piston 12 is moved in the cylinder. This piston is attached to or abuts a movable mechanism diagrammatically shown at 10c positioned within the housing 10a and sought to be moved by the piston. The piston has a portion 12 which fits the cylinder, a portion 12a of a lesser diameter and a step or shoulder 12b between the portions of the piston of different diameters. Seated upon the shoulder 12b are packing rings 13 of any suitable, flexible packing material adaptable to the service for which the device is being used. Attached to the small end of the piston by suitable holding means, such as a bolt 14, is a gland 15. The threaded end of the bolt is screwed into a hole axially located in the piston and its head is seated in a drilled out cavity or well 15a in the top face of the gland. The upper portion of the well is formed to receive a closure plug 16 and on the shoulder of well 15a where the plug seats is a pressure-tight sealing gasket 17. In the top of the closure plug is a square or hexagonal shaped depression 16a into which a socket wrench may be fitted in screwing in or removing closure plug 16.

The skirt 15b of the gland which surrounds the small end of the piston and seats upon the packing 13 transmits the pressures between shoulder 12b of the piston and the skirt of the gland is held in position by pressure of the gland as a result of the tightening of the holding or attaching means shown in the drawing as bolt 14. In other words, with the cylinder head removed and after applying the packing rings 13 to the shoulder of the piston, gland 15 is drawn up against the packing by means of bolt 14 sufficiently tight so that a proper initial seal is established between the piston and cylinder. The closure plug 16 is then screwed into the top of well 15a and seated against a sealing gasket 17 establishing pressure-tight and sealed off conditions beneath the gland including the well surrounding bolt 14. The plug also forms a seal for the hole in the gland through which the bolt passes and the space above the piston and beneath the gland. Pressure of the gland against the packing prevents leakage into the space surrounding the bolt and the possibility of leakage behind the packing. The cylinder head is replaced, the bolts tightened and the fluid pipe 11 connected.

Pressure imposed upon the head of the gland by the fluid is transmitted through the gland skirting to the packing. Consequently, as the pressure is increased the force upon the packing is increased. This axial pressure upon the packing produces a resultant radial movement causing the packing to squeeze outwardly against the cylinder wall, the amount of contact of the seal produced by this movement corresponds to the pressure imposed on the gland. Thus, when high pressures exist within the cylinder above the piston the radial pressures on the packing will be greatest while low pressures will produce corresponding low pressures on the packing. In other words, the force which produces the seal will depend upon the pressure imposed on the top of the piston. Under all conditions a satisfactory seal is produced.

Any pressure which exists behind the piston can have little or no effect upon the self-adjusting gland as bolt 14 which holds the packing in place is screwed down sufficiently tight initially to provide a constant pressure upon the packing when installed and the desired amount of sealing contact between the packing and the cylinder wall results. The gland pressure upon the packing which is in addition to the pressure proceeded by bolt 14 further prevents leakage under the packing into the space between the gland and piston.

While the piston structure is adapted for use wherever a self-adjusting piston may be efficiently employed it is particularly useful in digesters employed for obtaining cellulose from vegetable material wherein plungers, rams, piston seals or other piston device form a part of the equipment. In such apparatus the glands are usually inaccessible for quick and frequent adjustment. The treating liquors have a rapid deteriorating effect on piston seal packings necessitating a positive and self-adjusting arrangement which effectively seals the packing from the liquor and requires little or no attention over long periods of operation.

In operation pressure fluid introduced or discharged through pipe 11 causes the piston 12 to move in its cylinder adjusting with its movement the attached mechanism 10c.

From the foregoing it will be seen that the invention is well adapted to attain all of the ends and objects hereinbefore set forth together with other advantages which are obvious and which are inherent to the structure. As many possible embodiments may be made of the invention without departing from the scope thereof, it is to be understood that all material herein set forth or shown in the drawing is to be interpreted as illustrative and not in a limiting sense.

Having thus described my invention, I claim:

1. A self-adjusting gland assembly for piston packing which forms a seal between a cylinder wall and piston throughout the piston stroke and in which the piston is formed with a shoulder substantially the width of the packing, the improvement which comprises a gland covering the end of the piston of lesser diameter, said gland having a skirt surrounding the piston and extending into the annular space between the cylinder and piston, packing between the shoulder of the piston and the gland skirt, a sealed enclosure in the top of the gland, an adjustable fastening means within the sealed enclosure for imposing predetermined pressure on the packing during the inactive periods of the piston stroke and holding the gland in place on the piston.

2. An adjustable gland assembly for piston packing which forms the seal between a cylinder wall and piston throughout the piston stroke and in which the piston is formed with a shoulder substantially the width of the packing, the improvement which comprises a gland covering the end of the piston of lesser diameter, said gland having a skirt extending into the annular space between the cylinder and piston, packing between the shoulder of the piston and the gland skirt, a well axially positioned in the end face of the gland, a sealing closure for said seal, adjustable means within the well for fastening the gland to the piston for imposing predetermined pressure on the packing during the inactive periods of the piston stroke.

3. A self-adjusting gland assembly for piston packing which forms a seal between a cylindrical wall and a piston throughout the piston stroke and in which the piston is formed with a shoulder substantially the width of the packing, the improvement which comprises a gland covering the end of the piston of lesser diameter, said gland having a skirt surrounding the piston and extending into the annular space between the cylinder and piston forming a shoulder of substantially the same width as said shoulder on the piston, the area of said gland shoulder bearing a predetermined ratio to the area of the top face of said gland and determining the pressures imposed by said gland, packing between said shoulders, a sealed enclosure in the top of said gland, an adjustable fastening means within the sealed enclosure for imposing predetermined pressure on the packing during the inactive periods of the piston stroke and holding the gland in place on the piston.

JOAQUIN J. DE LA ROZA, Sr.